US007813111B2

(12) United States Patent
Anderson et al.

(10) Patent No.: US 7,813,111 B2
(45) Date of Patent: Oct. 12, 2010

(54) ELECTRONICS ENCLOSURE AND ASSOCIATED MOUNTING APPARATUS

(75) Inventors: James A. Anderson, Brentwood Bay (CA); Damon H. Langlois, Victoria (CA); Gregory P. Jacklin, Saanichton (CA); Ian Braithwaite, Victoria (CA)

(73) Assignee: Streetlight Intelligence, Inc., Victoria, BC (CA)

( * ) Notice: Subject to any disclaimer, the term of this patent is extended or adjusted under 35 U.S.C. 154(b) by 629 days.

(21) Appl. No.: 11/784,377

(22) Filed: Apr. 6, 2007

(65) Prior Publication Data

US 2007/0236869 A1 Oct. 11, 2007

Related U.S. Application Data

(60) Provisional application No. 60/789,634, filed on Apr. 6, 2006.

(51) Int. Cl.
*H02B 1/30* (2006.01)

(52) U.S. Cl. ....................... 361/674; 361/173; 361/600; 361/641; 362/265; 362/294; 362/372

(58) Field of Classification Search ................. 361/173, 361/600, 641, 651, 710, 714, 674, 807, 810
See application file for complete search history.

(56) References Cited

U.S. PATENT DOCUMENTS

| | | | | |
|---|---|---|---|---|
| 373,345 | A | 11/1887 | Elder | |
| 4,500,946 | A * | 2/1985 | Mikola | 362/645 |
| 4,665,519 | A | 5/1987 | Kirchner et al. | |
| 4,764,854 | A * | 8/1988 | Matsune et al. | 362/649 |
| 5,010,322 | A | 4/1991 | Fry et al. | |
| 5,202,815 | A | 4/1993 | Le Boennec et al. | |
| 5,535,118 | A | 7/1996 | Chumbley | |
| 5,621,363 | A | 4/1997 | Ogden et al. | |
| 5,708,833 | A | 1/1998 | Kinney et al. | |
| 5,764,492 | A | 6/1998 | Ady et al. | |
| 5,809,067 | A | 9/1998 | Funk et al. | |
| 5,909,480 | A | 6/1999 | Reynaud et al. | |
| 6,157,546 | A | 12/2000 | Petty et al. | |
| 6,275,390 | B1 | 8/2001 | Wu et al. | |
| 6,295,031 | B1 | 9/2001 | Wallace et al. | |
| 6,369,320 | B1 | 4/2002 | Okamoto | |
| 6,385,055 | B1 | 5/2002 | Kramer et al. | |
| 6,392,900 | B1 | 5/2002 | Petty et al. | |
| 6,789,013 | B2 | 9/2004 | Annett et al. | |
| 6,896,553 | B2 | 5/2005 | Espenshade et al. | |

(Continued)

*Primary Examiner*—Jayprakash N Gandhi
*Assistant Examiner*—Courtney Smith
(74) *Attorney, Agent, or Firm*—Fish & Richardson P.C.

(57) ABSTRACT

An enclosure is arranged for housing electronics associated with a luminaire and includes a first member including a mounting interface arranged to couple the first member to the luminaire and a second member mechanically coupled to the first member. The mounting interface facilitates provisionally coupling the first member to the luminaire and securing the enclosure to the luminaire. A corresponding mounting apparatus for securing an enclosure to a luminaire includes a mounting member having an opening and configured to be secured to a surface of a luminaire and a neck portion extending from the enclosure and configured to pass through the opening. The neck portion includes a neck opening that is configured to allow wiring to be routed from the electronics to the luminaire. The neck portion and the mounting member may include respective complementary surfaces to provide a mounting interface for provisionally coupling the enclosure to the luminaire.

22 Claims, 10 Drawing Sheets

U.S. PATENT DOCUMENTS 7,006,361 B2 2/2006 Hosokawa et al.
7,014,339 B2 * 3/2006 Sears et al. ................ 362/265
7,063,445 B2 * 6/2006 Wang et al. ................ 362/368
2007/0253201 A1 * 11/2007 Blincoe et al. .............. 362/294

* cited by examiner

ELECTRONICS ENCLOSURE AND ASSOCIATED MOUNTING APPARATUS

RELATED APPLICATIONS

The present application is related to and claims priority from U.S. Provisional Application, Ser. No. 60/789,634 filed on Apr. 6, 2006 which is hereby incorporated herein in its entirety by reference.

FIELD OF THE INVENTION

This invention relates in general to electronics enclosures and more specifically to techniques and apparatus for such enclosures associated with luminaires.

BACKGROUND OF THE INVENTION

Luminaires, such as are used for illumination of specific or general areas, e.g., street lighting, parking lot lighting, or the like, are known. Such luminaires are typically installed in outdoor environments where conditions can vary widely depending on current local weather conditions (Alaska winters vs Phoenix summers).

Luminaires in addition to being installed in adverse environments are typically relatively high powered lighting fixtures that operate off of AC power sources and utilize high voltage lamps, e.g., high pressure sodium lamps or the like. Luminaires, thus, while operating tend to dissipate a significant amount of energy in the form of heat and thus can have a high internal ambient temperature. Furthermore, many luminaires utilize electrical or electronic ballasts to supply the requisite voltages and currents to sustain an electric arc that supplies the light required for purposes of lighting. As is known the combination of relatively high voltages or currents which vary widely over time and the like tends to result in significant electromagnetic energy fields, i.e. significant Electro-Magnetic Interference (EMI).

Luminaires are available from numerous suppliers and these suppliers typically arrange the luminaire components in different manners. Regardless of the supplier, most luminaires have been designed with a package size that is suitable for the normal components found in such luminaires, e.g., lamps, reflectors, ballasts, etc. Generally these luminaries do not include sufficient space for substantial additional components or such space may vary widely among different luminaries from different suppliers.

More recently in the interest of energy savings, etc., luminaires that include additional electronic control and communications functionality and circuitry have been proposed. Unfortunately, the limited and varying luminaire package space, adverse or hostile temperatures, and EMI profiles, can make it difficult to include the additional electronics for control and communication in any one luminaire much less across varying luminaires from varying suppliers.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 7 through FIG. 12 illustrates additional details in various plan views of the first or upper member of the enclosure of FIG. 2 in accordance with one or more embodiments;

DETAILED DESCRIPTION

In overview, the present disclosure concerns enclosures for electronics and associated mounting apparatus and methods, e.g., enclosures for electronics associated with a luminaire, and more specifically techniques and apparatus for mounting the enclosures or housing for the electronics to a luminaire such that the electronics will have sufficient space and an appropriate environment within which to operate and yet remain highly serviceable both from an initial installation or subsequent servicing perspective.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles embodied in the particular components discussed below are best implemented with or in conventional manufacturing technologies for such components, e.g., metal or aluminum casting or plastic molding processes. It is expected that one of ordinary skill, notwithstanding possibly significant effort and many design choices motivated by, for example, available time, current technology, and economic considerations, when guided by the concepts and principles disclosed herein will be readily capable of generating such components using known manufacturing technologies or technologies that may be developed with minimal experimentation. Therefore, in the interest of brevity and minimization of any risk of obscuring the principles and concepts according to the present invention, further discussion of manufacturing processes for such components, if any, will be limited to the essentials with respect to the principles and concepts of the various embodiments.

Figure 1:
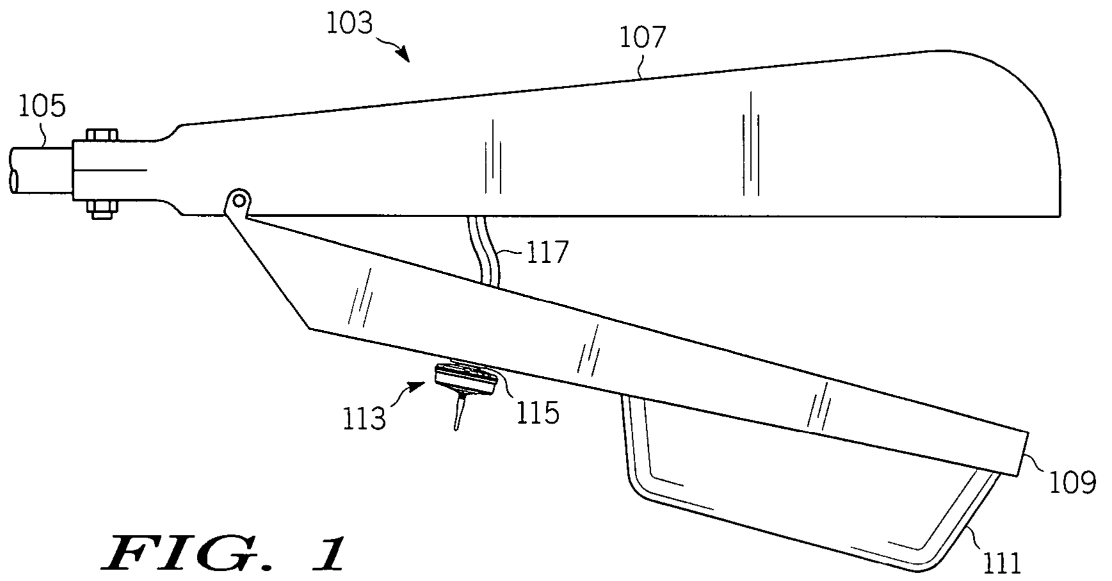
FIG. 1 depicts in a simplified and representative form, a diagram of a luminaire and housing or enclosure in accordance with one or more embodiments.

Referring to FIG. 1, a simplified and representative high level diagram of a luminaire and enclosure or housing in accordance with one or more embodiments will be briefly discussed and described. In FIG. 1, a luminaire 103 is shown where the luminaire is secured to an arm 105 which can be a portion of, e.g., an outdoor lighting installation for street or parking lot illumination. The luminaire 103 is depicted with a top portion 107 that typically includes a reflector, lamp, ballast and the like with alternating (AC) power supplied by wiring (none specifically shown) that is routed through the arm. In FIG. 1, the luminaire 103 is depicted with a lower or bottom portion 109 in an open position such as may be seen when the luminaire is being serviced. The bottom portion of the luminaire often includes or carries a lens 111 which helps protect the contents of the luminaire and direct the light emitted by the lamp.

Additionally shown is an electronics housing 113 that is mechanically coupled to the luminaire or more specifically can be coupled to a mounting apparatus or member 115. Note that wiring or cabling is routed from the enclosure or electronics therein to the balance of the luminaire, e.g., ballast, lamp, AC power, various sensors (not specifically shown), etc. Such electronics may allow an operator to communicate with the luminaire to obtain operating data or control various parameters associated with the lighting level or duration of light generation or the like. The mounting member 115 can be secured to the luminaire or a lower or bottom surface of the luminaire when the luminaire is installed in a normal operating position. This arrangement provides some protection from the elements for the enclosure and electronics contained therein, and some protection against incursion of the elements into the luminaire via the opening in the bottom portion.

The electronics enclosure 113 thus includes or represents a housing for one or more electrical/electronic circuits, e.g., controllers and communication modems, where the controllers are configured to control or monitor the operation or functionality of some other apparatus, e.g., a luminaire assembly for lighting purposes or other apparatus.

In one embodiment the enclosure houses both a process controller and one or more modems that are configured for communication with some other entity. These modems may be one or more of a radio frequency modem or wired modem, e.g. PSTN, coaxial cable, other broad band wired interface, a power line modem, or possible combinations thereof. If a wireless or radio frequency modem is utilized an antenna 118 can be provided and integrally mounted to the enclosure. Note that some wireless applications may allow the antenna to be fully contained within the enclosure. For wired applications the antenna will not be necessitated and thus not provided.

Various embodiments of the enclosure are suitable for installation in an outdoors or other wise hostile environment, e.g., an outdoor luminaire, and arranged to provide a weather resistant or weather proof housing for any enclosed electrical/electronic circuits.

Generally the enclosure is configured to provide a housing or enclosure for electrical/electronic circuits or components which is largely separate or separated from any apparatus (and any corresponding housing or enclosure) that is monitored or controlled. This advantageously allows for different environments for the electrical/electronic circuits or components and the controlled or monitored apparatus.

For example, in one embodiment, controllers and communication modems are housed in the enclosure and these are utilized to monitor and control the electrical circuitry in a luminaire that is used for street lights or other outdoor or indoor lighting applications. A luminaire typically includes a ballast, capacitor, one or more high intensity discharge light bulbs, and the like. As suggested earlier, the ballast, capacitor, high intensity discharge bulb, etc. are prone to significant thermal dissipation and thus heat generation as well as generation of high levels of Electro-Magnetic Interference (EMI).

By providing essentially a separate enclosure or housing, the electrical/electrical components or circuits can effectively be protected or isolated from excessively high temperatures as well as EMI, and the like. Furthermore, in applications such as a luminaire with little or no extra space, the separate enclosure provides sufficient volume to provide a housing for the control and monitoring electronics and electrical circuits without worrying about adversely effecting the physics of the luminaire and its light generation or targeting parameters.

In applications, such as a luminaire for street or parking lot lighting, the enclosure and associated electronics, as depicted in FIG. 1, can be mounted to a typically metal portion on the underside of and typically behind a lens of the luminaire so as to face in the same direction as the lens and thus direction of light output. In other lighting applications other arrangements may be used.

Figure 2:
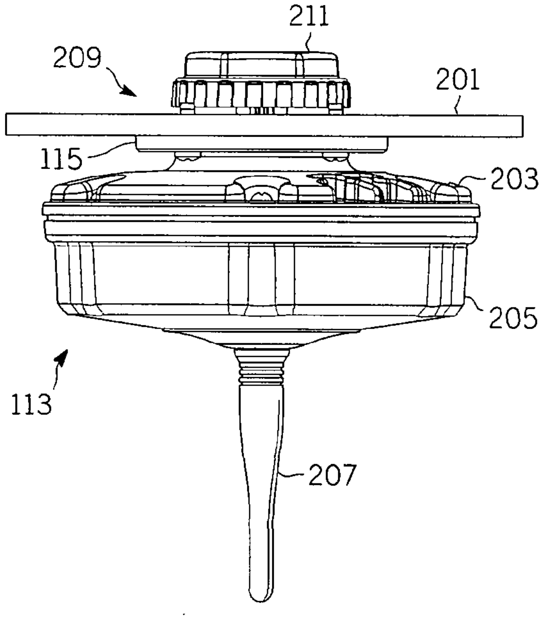
FIG. 2 in a representative form, shows a side view of the enclosure of FIG. 1 that illustrates in more detail the enclosure and mounting arrangement or interface in accordance with one or more embodiments.
Figure 3:
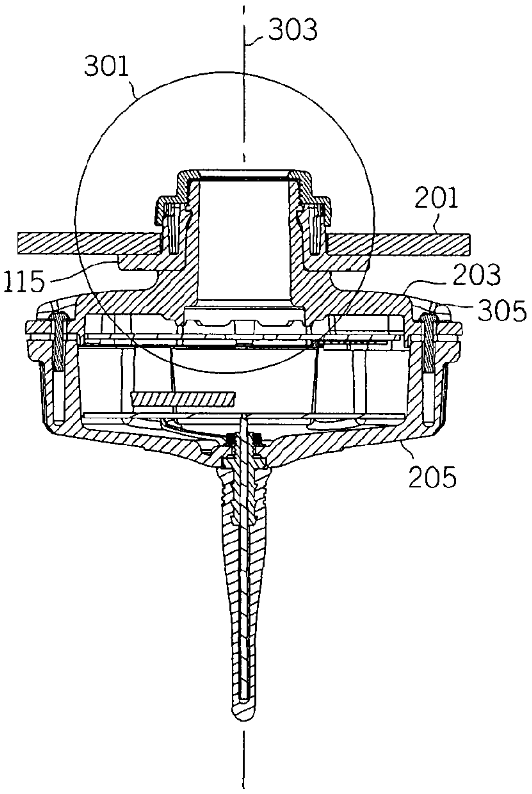
FIG. 3 depicts a cross section of the FIG. 2 illustration through a plane defined by the paper in accordance with one or more embodiments.
Figure 4:
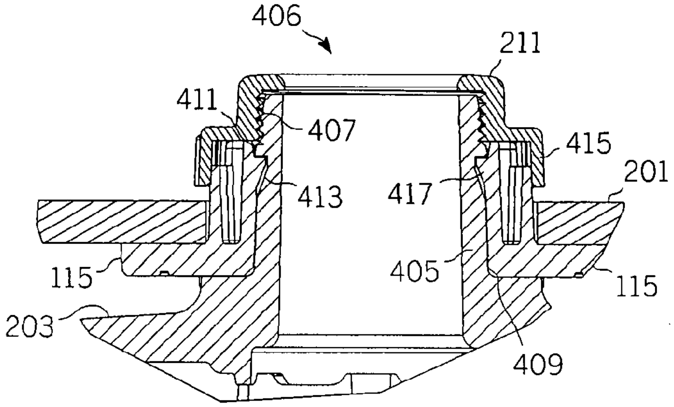
FIG. 4 depicts a more detailed and representative diagram of a portion of the FIG. 3 cross section in accordance with one or more embodiments.
Figure 5:
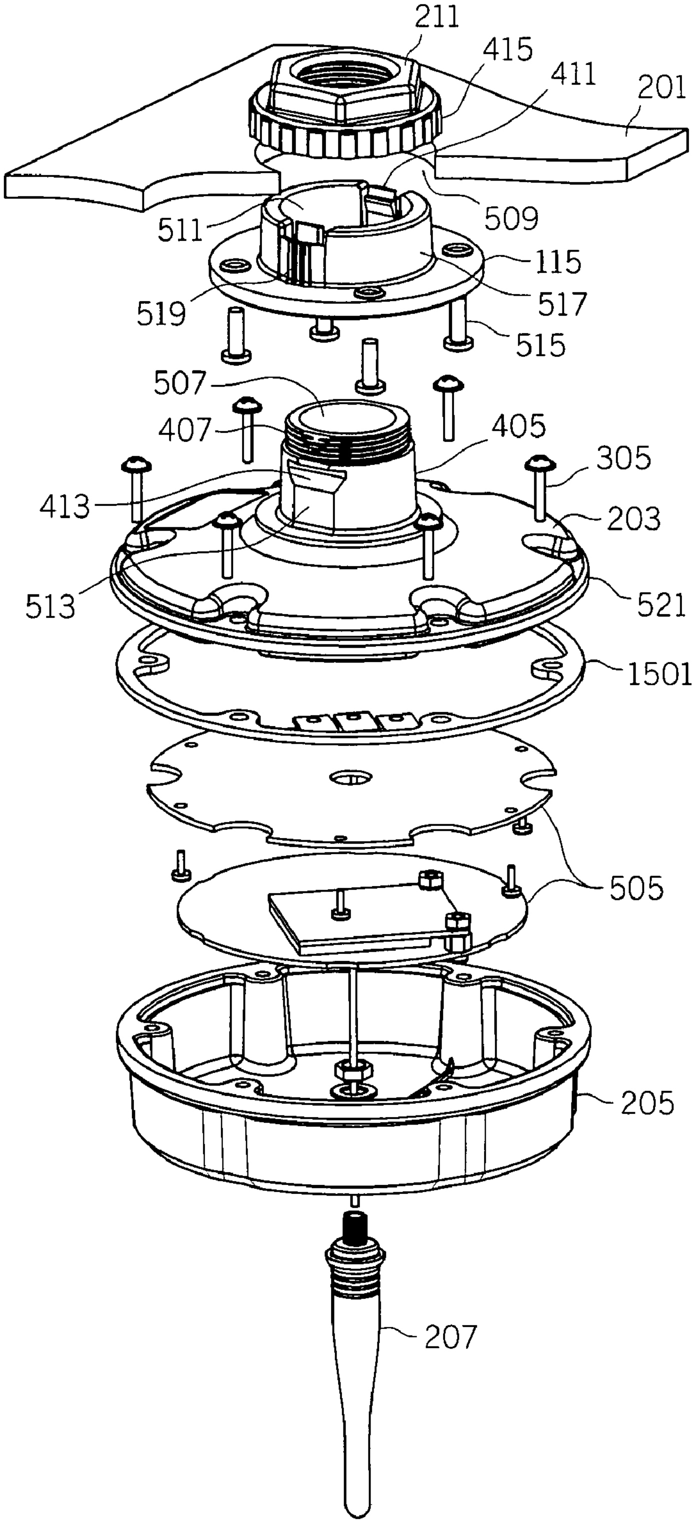
FIG. 5 and FIG. 6 depict exploded views of the enclosure, etc. of FIG. 2 from, respectively, a top and bottom perspective, in accordance with one or more embodiments.
Figure 6:
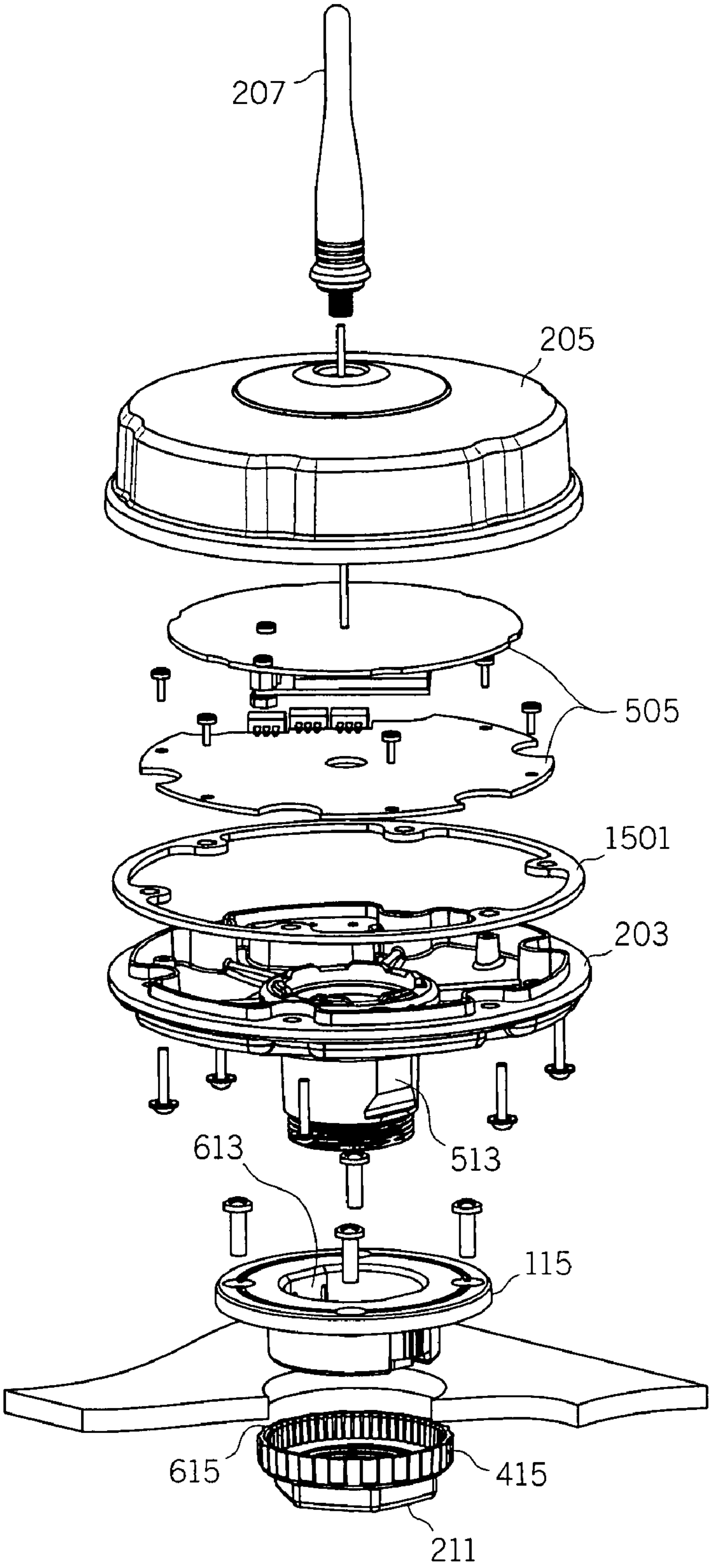

Referring to FIG. 2-FIG. 4, a representative side view, cross section, and detailed cross section, respectively, of the enclosure of FIG. 1 that illustrates in more detail the enclosure and mounting arrangement or interface in accordance with one or more embodiments will be discussed and described. In one or more embodiments as shown in FIG. 2-3 and various other associated figures, the enclosure 113 is mechanically coupled to a luminaire, such as luminaire 103, or more specifically a mounting surface 201 of the luminaire. The enclosure includes a first housing member 203 (alternatively described as a first member, upper housing member, or base member) and second member or housing member 205 (alternatively described as a second member, lower housing member, cup, or cover member), one or more of which members form a cup or bowl like space or volume (e.g., the second member 205 and space within the cross sectional view of FIG. 3). The first and second members are configured to be coupled or secured together, e.g., via screws 305 or the like, possibly with a gasket (see FIG. 15, 1501) to form a weather resistant or weather proof housing or enclosure with sufficient internal volume for mounting and housing assorted electronics and corresponding pc boards or other substrate materials (see also 505 in the exploded view of FIG. 5-6). In some embodiments one of the housing members, e.g., the second member 205, is further arranged to secure an antenna 207 if required.

One of the housing members in some embodiments can also include a mounting interface 209 that can further comprise a neck portion 405 that is at least partially threaded, i.e., includes a threaded end 407. In some embodiments and referring additionally to the exploded views of FIG. 5-6, the neck portion when installed is disposed through an opening in a mounting surface 509 (also see detailed cross sectional view of FIG. 4, 406) and secured thereto with a threaded locking nut 211 and possibly associated locking member. In other embodiments, the neck portion is disposed through an opening or mounting opening 511 in a mounting member 115. The mounting member is secured, e.g., via screws 515 or the like, to a mounting surface, e.g., surface 201 on a luminaire. The neck portion can include a surface or keying surface 513 that is arranged to match with or coordinate with a complementary keying surface 613 on the mounting member (see also 409 in FIG. 4). For example, the neck portion may have one or more flat surfaces in an otherwise generally circular cross section where the flat portions are keyed or matched to complementary surfaces or flat surfaces on the inside of an otherwise generally circular opening in the mounting member. The outside surface 517 of the mounting member 115 can be generally circular with raised ridges 519 in one or more areas. A threaded nut 211 can be used to engage the threaded neck portion and secure the threaded neck portion and thus enclosure to the mounting member. By including a surface 615 on an inner portion of a flange or skirt 415 on the locking nut where the surface 615 includes features, e.g., raised ridges or the like, that interferes with the raised ridges 519 in a controlled manner, the threaded nut can be essentially locked in position and minimize concerns about vibrations, etc. causing the nut to loosen.

In some embodiments the neck portion can include recessed portions or cavities 413, e.g., in one or more of the flat surfaces where these recesses 413 are disposed between the threaded portion and the corresponding housing member. The mounting member can include resilient tabs 411 with projecting members such that when the neck portion of the housing member is disposed through the opening in the mounting member the projecting members will engage the recesses 413 or cavities in the neck portion. This advantageously allows the enclosure to be at least temporarily secured or provisionally coupled to the mounting member while other installation or service procedures are performed, without using or before finally securing the enclosure to the luminaire or other mounting surface using the threaded nut. Service personnel can thus thread cables through an opening into the enclosure through the neck portion, the mounting member, locking nut, and mounting surface and make appropriate connections of these cables or other adjustments without undue concern about loosing or dropping the enclosure and associated electronics during these activities. Typically this activity is taking place on some sort of personnel lift that may be 50 or so feet above the surface to be lighted and thus can be a significant concern.

With these features an easy connection mechanism and corresponding method is provided between an electronics enclosure and for example a luminaire. The connection approaches use either a threaded fitting or alternatively a snap-fit arrangement for at least a temporary installation followed by a threaded nut if desired. It is expected that the snap fit scheme and corresponding methodology can be used in many applications.

Thus, FIG. 2-FIG. 6 show various views that define from one or more aspects, an enclosure 113 which is arranged, constructed, and configured for housing and protecting electronics (depicted as printed circuit boards or other carriers at 505), where these electronics can be associated with a luminaire 103, e.g., control, monitoring, and communication functions associated with the luminaire. The enclosure 113 comprises a first member 203 including a mounting interface 209 that configured and arranged to couple the first member to the luminaire and a second member 205 that is mechanically coupled, e.g., by screws 305, to the first member. The first member and the second member provide or define a space or volume which is the enclosure for the electronics. In one or more embodiments, the first member can be formed from cast aluminum via conventional casting processes and can be used for thermal dissipation or spreading for various components of the enclosed electronics (see, e.g., FIG. 7, heat sink feature 703). The second member can be formed by molding an appropriate plastics compound, e.g. Valox from GE or other thermoplastic polyester resin. Generally the members need to be UV stable and corrosion resistant to outdoor environments over a lifetime that can span decades. The first member needs to be thermally stable over environments representative of a luminaire and the like.

In embodiments of the enclosure 113 where communications is over a wireless link, an appropriate antenna 207 can be provided wherein the antenna is secured to, e.g., a bottom surface of the second member or in some applications the antenna may be internal to the enclosure. The enclosure 113 and specifically the first member 203 with the mounting interface 209 can be arranged and configured to be secured to a lower mounting surface, e.g., mounting surface 201 of the luminaire 103 when the luminaire is installed in an operating configuration as generally depicted in FIG. 1. In various embodiments, the first member 203 further comprises or includes a neck portion 405 that facilitates coupling the first member and thus the enclosure to the luminaire. As will be further discussed, the coupling includes mechanically coupling, either provisionally or temporarily or securing the first member and thus enclosure to the luminaire or an intermediate mounting member 115 which is secured to the luminaire.

For example in some embodiments the neck portion includes a neck opening 507 that is generally circular in cross section as viewed from above the neck portion. The neck opening is configured to allow wiring to be routed from the electronics in the enclosure to the luminaire or various components thereof. The neck portion extends perpendicular to a plane of the first member, i.e. a plane defined by the outer edge 521 of the first member, such that when the first member is coupled to the luminaire, a threaded end 407 of the neck portion extends through an opening 509 in a surface of the luminaire. Thereafter in some embodiments, a locking nut 211 is configured and can be used to secure the first member to a surface of the luminaire by engaging the threaded end. The locking nut will be exposed to the internal thermal environment of a luminaire and can be manufactured via a plastic molding process using a relatively thermally stable resin such as a Polyamid (Nylon) compound that is an injection molding homopolymer which is available in various forms from BASF and other suppliers.

In other embodiments as depicted in the various figures, the enclosure further comprises a mounting member 115 with a mounting opening 511. The mounting member is arranged and configured to be secured to the surface or mounting surface 201 of the luminaire or other apparatus by, e.g., screws 515. In these embodiments, the neck portion 405 extends through the mounting opening when the first member is coupled to the luminaire (see, e.g., FIG. 3-4. The mounting member or receiver will also be exposed to the thermal environment of a luminaire and thus must be temperature stable. The mounting member can be manufactured using conventional injection molding processes and resins similar to those used for the locking nut.

In some embodiments, the neck portion 405 includes a keying surface 513 with two shown in FIG. 8 which may be a flat surface in an otherwise generally circular outer surface of the neck portion. The mounting member further includes complementary keying surfaces 613 that align with the keying surface 513 when the first member is coupled to the luminaire thus establishing a predetermined angular position of the first member with respect to the mounting member about axis 303. In further embodiments, the mounting member is arranged to be temporarily or provisionally coupled to the first member by one or more resilient tabs 411 engaging one or more complementary recesses 413. In the diagrams, the mounting member includes the one or more resilient tabs and the one or more resilient tabs include corresponding projecting members 417 (see also FIGS. 16-17) and the neck portion includes the one or more complementary recesses which are engaged by the resilient tabs or specifically projecting members. It will be appreciated that the projecting members and complementary recesses could be reversed in location.

From a further aspect, the figures show and teach an enclosure mounting apparatus for provisionally coupling and securing an enclosure 113 for electronics to a luminaire 103. The enclosure mounting apparatus comprises the mounting member 115 with the mounting opening 511, where the mounting member is configured to be secured to a surface, e.g., lower mounting surface 201, of a luminaire at a luminaire opening 509 in the surface and a neck portion 405 extending from the enclosure and configured to pass through the mounting opening. The neck portion includes a neck opening 507 that is configured to allow wiring 117 to be routed from the electronics to the luminaire. The neck portion and the mounting member include respective complementary surfaces, e.g., the resilient tabs 411 and recesses 413, to provide a mounting interface for provisionally or temporarily coupling the enclosure to the luminaire. As noted above the mounting member 115 is further arranged and configured to be secured to a lower surface of the luminaire when the luminaire is installed in an operating configuration.

In some embodiments, the enclosure mounting apparatus further comprises a locking nut 211 and the neck portion further comprises a threaded end 407. The threaded end is sufficiently long to extend through the mounting opening and the locking nut is configured to secure the neck portion and thus enclosure to the surface of the luminaire by engaging the threaded end. The neck opening is generally circular in cross section when viewed at a plane perpendicular to the paper and to an axis 303 of or that passes through the neck opening and otherwise configured to allow wiring or cabling to be routed from the electronics in the enclosure to and from the luminaire or components thereof.

The mounting member 115 in some embodiments includes a surface 517 with raised ridges 519 at one or more locations and the locking nut further comprises a surface 615 with ridges and recesses or peaks and valleys that controllably interferes with the raised ridges 519 when the neck portion is secured to the luminaire by the locking nut. In some embodiments, the neck portion 405 includes one or more keying surfaces 513 and the mounting member includes corresponding complementary keying surfaces 613 that align with the keying surfaces when the enclosure is coupled to the luminaire thus establishing a predetermined angular position of the neck portion with respect to the mounting member. In some embodiments, the mounting member is arranged to be provisionally coupled to the neck portion by resilient tabs engaging complementary recesses. The mounting member can include the resilient tabs and the resilient tabs can include projecting members while the neck portion can include the complementary recesses or vice a versa. In any event, the projecting members are configured for engaging the complementary recesses when the mounting member is provisionally coupled to the neck portion. The resilient tabs or specifically the projecting members and the complementary recesses include one or more angled surfaces (see FIGS. 12 and 16) selected to control the force needed to engage and disengage the projecting members and the complementary recesses, i.e., disengage the enclosure and the luminaire. Experimentation can be used to determine appropriate levels of the effort or force.

Figure 9:
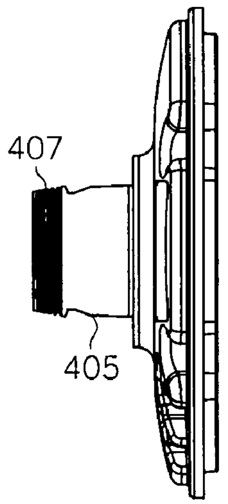
Figure 10:
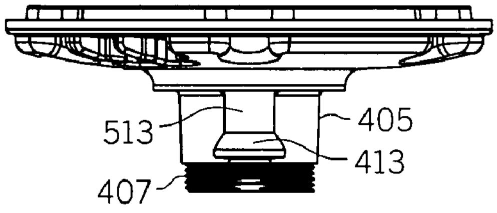
Figure 11:
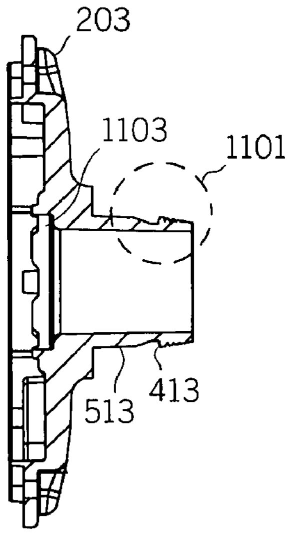
Figure 12:
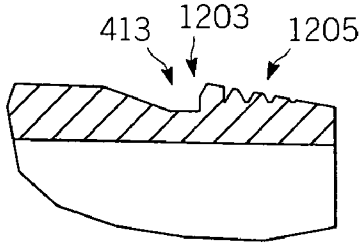

FIG. 7 through FIG. 12 illustrates additional details in various plan views of the first or upper member 203 of the enclosure of FIG. 2 in accordance with one or more embodiments. FIG. 7 shows an internal or bottom side view (see FIG. 5) and illustrates the generally circular arrangement for one embodiment of the first member and an embodiment where electronic components may be attached to a heat sink 703. FIG. 8 shows an exterior or top side view, where the keying surfaces 513 and generally otherwise circular nature of the neck portion as well as circular cross section for the neck opening are clearly evident. FIG. 9 is a side view that illustrates a profile of the neck portion and the threaded end 407. FIG. 10 is an additional side view that illustrates the neck portion 407 from a plan perspective that shows the keying surface 513 and cavities or recesses 413. FIG. 11 is a mirror image cross sectional view of FIG. 9 which illustrates in profile keying surfaces 513 and recesss 413 and identifies an area 1101 that is shown in further detail in FIG. 12. FIG. 12 illustrates angled surfaces 1203 and 1205 each of which will have an impact on the effort required to engage or disengage the neck portion 405 of the first member 203 and the mounting member 115. As the first member or neck portion is inserted into the mounting member to engage the two, the resilient tabs will be moved away from the recesses by the angle surface 1205. To disengage, the mounting member and the neck portion sufficient force must be applied to move the resilient tab away from the recess. This will depend on the profile of the surfaces 1203. Note that a flat bladed screw driver can be used to facilitate movement of the resilient tabs away from the recesses.

Figure 13:
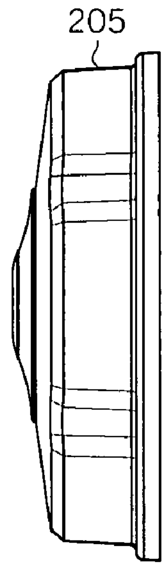
FIG. 13 through FIG. 14 illustrates additional details in various plan views of the second or lower member of the enclosure of FIG. 2 in accordance with one or more embodiments.
Figure 14:
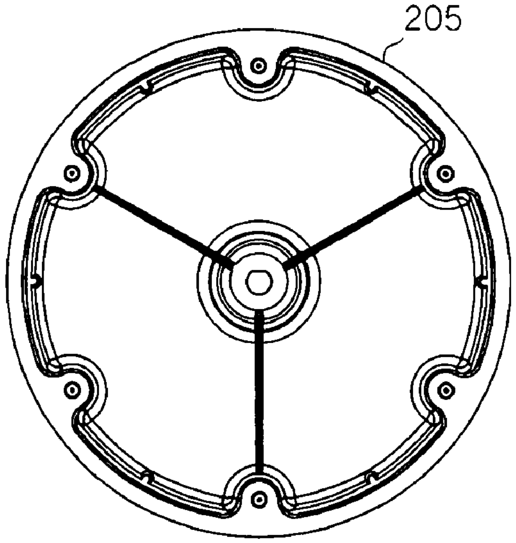

FIG. 13 through FIG. 14 illustrates additional details in various plan views of the second or lower member 205 of the enclosure of FIG. 2 in accordance with one or more embodiments. FIG. 13 shows a side plan view that illustrates the general cup shape of this member. FIG. 14 shows an internal plan view of the second member 205 and illustrates the generally circular nature of this member.

Figure 15:
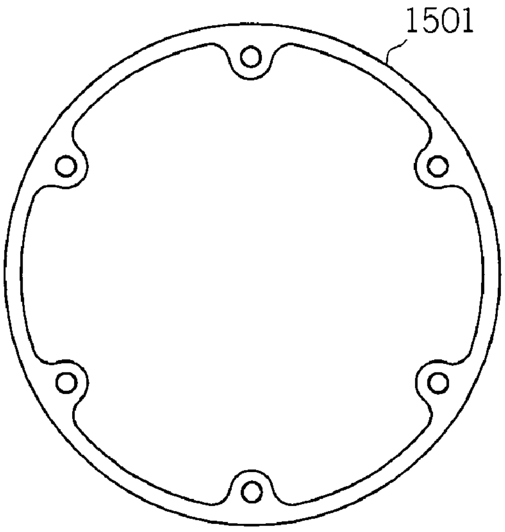
FIG. 15 illustrates additional detail for a gasket between the first and second members of FIG. 2 accordance with one or more embodiments.

FIG. 15 illustrates additional detail for a gasket between the first and second members of FIG. 2 accordance with one or more embodiments. Generally the gasket is shown from a top plan perspective. The gasket can be used to provide a weather seal between the first and second members of the enclosure and can be manufactured from Neophrene, siliconrubber or the like of appropriate durometer and density. As will be observed from FIG. 15, FIG. 7 and FIG. 14, that the form of the gasket matches the surfaces of the first and second members where the gasket is intended to be positioned.

Figure 16:
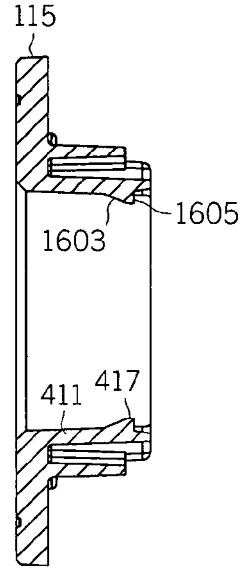
FIG. 16 through FIG. 20 illustrates additional details in various plan views of the mounting member of FIG. 2 in accordance with one or more embodiments.

FIG. 16 through FIG. 20 illustrates additional details in various plan views of the mounting member 115 of FIG. 2-6 in accordance with one or more embodiments. FIG. 16 shows a cross sectional view of the mounting member 115 from a side on perspective which illustrates in cross section the resilient tabs 411 and projecting members 417 as well as angled surfaces 1603, 1605. As noted above one or more of the angled surfaces 1603, 1605 can be selected (relative angles) together with the width or thickness of and the material used for the lever arm of the resilient tabs 411 in addition to the angled surfaces in FIG. 12 to control the force associated with engaging or disengaging the mounting member and the neck portion. For example, given a particular material and geometry for the resilient tab or lever arm thereof, the angled surface 1603 together with angled surface 1205 (specifically relative angles) will control the force associated with engaging the neck portion and the mounting member. The engaging operation may yield a noticeable snap when the two are engaged, thus prompting some to refer to this enclosure mounting apparatus as a snap mount. Similarly the angled surface 1605 and 1203 or profiles thereof together with the relative depth of the projecting member 417 and associated recess 413 can be selected to control the force or effort associated with disengaging the neck portion and mounting member.

Figure 17:
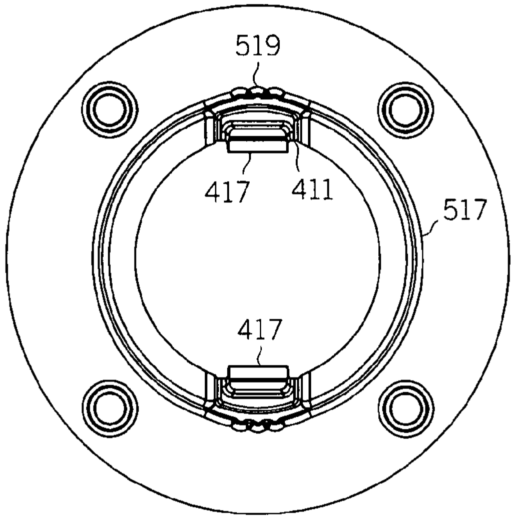
Figure 18:
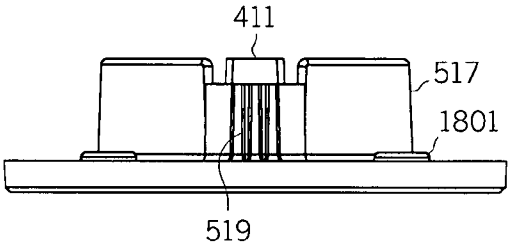
Figure 19:
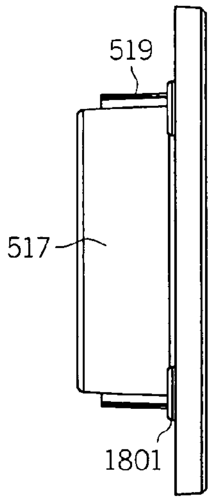
Figure 20:
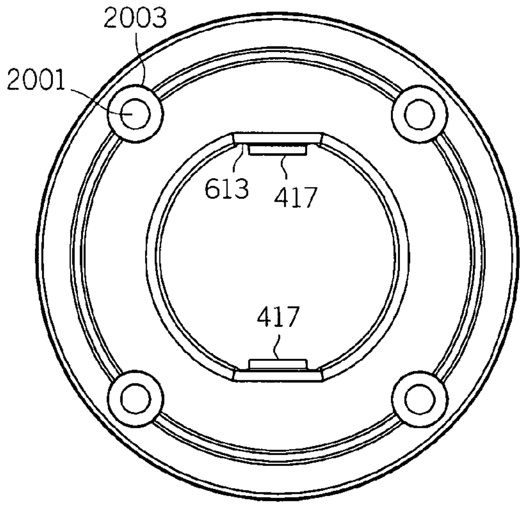

FIG. 17 shows a top plan view (see FIG. 5) of the mounting member 115 which illustrates, among other features, the projecting members 417, the resilient tabs 411 from a top perspective, and the raised ribs 519 on one or more portions (two shown) of the outer surface 517 of the mounting member. FIG. 18 is a lower side view of the mounting member of FIG. 17 and again illustrates the raised ribs or ridges 519 from a head on perspective as well as a top portion of the resilient tabs 411. FIG. 18 also shows a slightly raised shoulder 1801 surrounding locations for mounting screws. FIG. 19 is a right side view of the FIG. 17 mounting member 115, which illustrates the raised ridges from a side profile perspective as well as the raised shoulder 1801. FIG. 20 is a bottom side view of the FIG. 17 mounting member that illustrates locations 2001 including a counter sink feature 2003 for mounting screws, the keying surfaces 613, and the projecting members 417 from this perspective. A gasket (not shown) can be placed between the mounting member and the mounting surface of a luminaire or other apparatus if desired or needed and the raised shoulders 1801 can be used to align this gasket.

Figure 21:
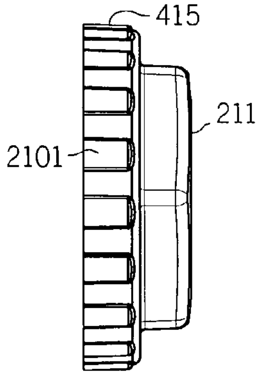
FIG. 21 through FIG. 24 illustrates additional details in various plan views of the locking nut of FIG. 2 in accordance with one or more embodiments.
Figure 22:
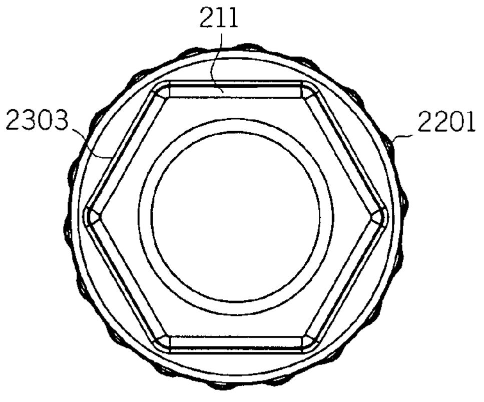
Figure 23:
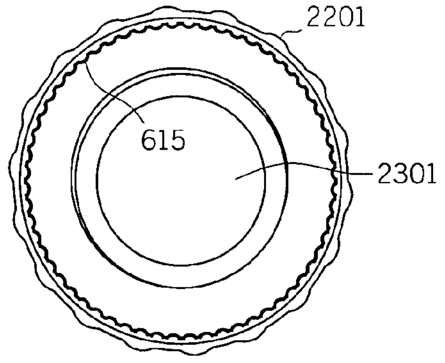
Figure 24:
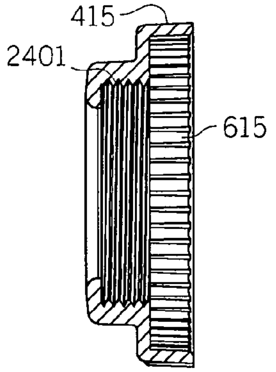

FIG. 21 through FIG. 24 illustrates additional details in various plan views of the locking nut 211 of FIG. 2 in accordance with one or more embodiments. FIG. 21 is a side plan view of the locking nut 211 that illustrates the flange or skirt 415, including an outer edge 2101 of the flange 415 with raised ridges to facilitate turning the locking nut by hand. FIG. 22 is a top side plan view of the locking nut 211 which illustrates the raised ridges 2201 on the flange 415 and a six sided feature 2303 suitable for engaging a conventional wrench for turning or rotating the locking nut. FIG. 23 is a bottom side plan view of the locking nut which (along with FIG. 23 and others) illustrates an opening 2303 through the locking nut, the raised ridges 2201 and the inner surface 615 with interfering ridges to controllably interfere with the ridges 519 and thereby lock or fix the rotational position of the locking nut relative to the mounting member. FIG. 24 shows a cross sectional view of the locking nut of FIG. 21-23 which again illustrates the flange 415, inner surface 615 with ridges and threaded feature 2401 of the nut.

Figure 25:
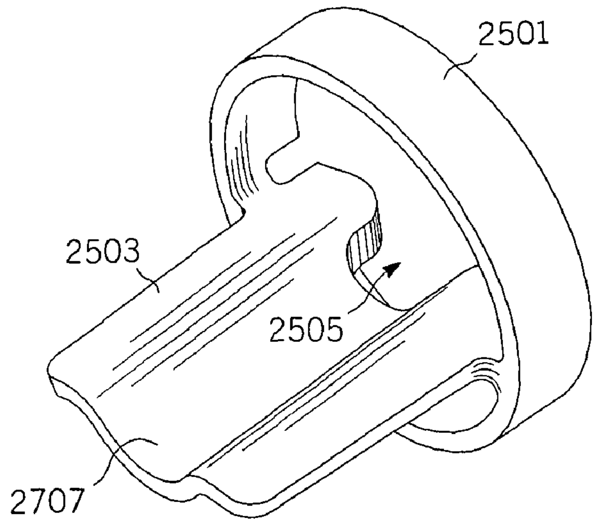
FIG. 25 through FIG. 26 illustrates a wire guide in various perspective views which can be used with the enclosure of FIG. 2 in accordance with one or more embodiments; and FIG. 27 through FIG. 31 illustrates a plug in various plan views which may be used in lieu of the enclosure of FIG. 2 in accordance with one or more embodiments.
Figure 26:
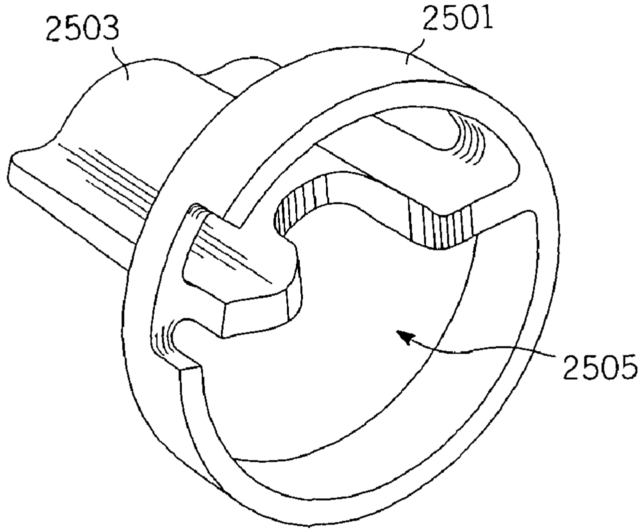

FIG. 25 through FIG. 26 illustrates a wire guide in various perspective views which can be used with the enclosure of FIG. 2 in accordance with one or more embodiments. FIG. 25-26 show a collar 2501 which is configured to be seated on a shoulder (see FIG. 11, 1103) from the internal side of the first member and an elongated shelf 2503. The elongated shelf 2503 is disposed within the neck opening of the first member (see FIG. 11). Any wiring or cabling 117 can be dressed through the opening 2505 in the collar 2501 and along the shelf in the indentation 2707 and in some embodiments secured, e.g., via a ty wrap or the like, to the shelf if desired. The wire guide can be manufactured using injection molding processes and a conventional ABS resin.

Figure 27:
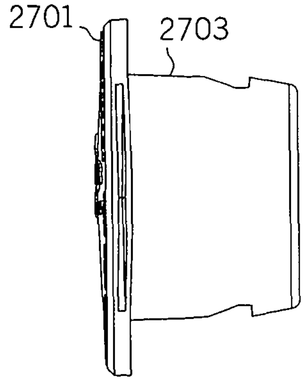
Figure 28:
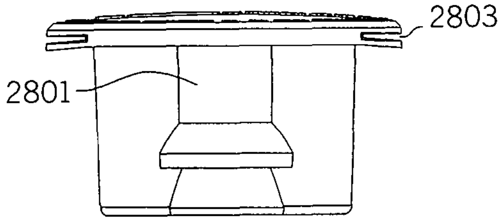
Figure 29:
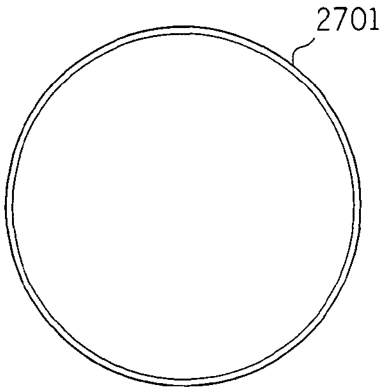
Figure 30:
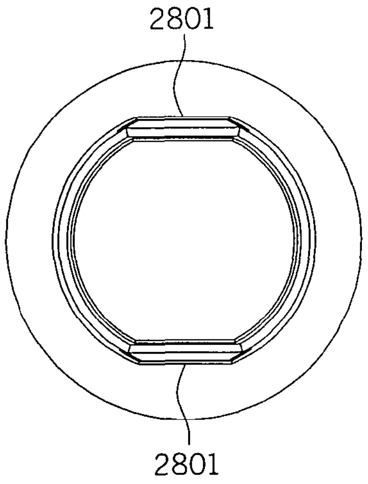
Figure 31:
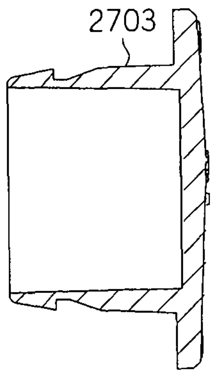

FIG. 27 through FIG. 31 illustrates a plug 2701 in various plan views which may be used in lieu of the enclosure 113 of FIG. 2 in accordance with one or more embodiments. FIG. 27 illustrates a right side plan view of the plug 2701 which shows a neck portion 2703 with a profile similar to the neck portion 405. Generally the plug can be installed in luminaires that are equipped with the mounting member but do not yet have an associated electronics enclosure. The plug is installed in the mounting opening from the exterior of the luminaire along with a gasket (not shown) if desired. Before and once it is desired for a luminaire to be equipped with the associated electronics and enclosure, the plug can be removed from the mounting opening of the mounting member and the enclosure can be installed or mounted and cabling, etc. connected as appropriate. FIG. 28 depicts a bottom side plan view that illustrates the plug and a keying surface 2801 that is similar to the keying surface 513, etc. as well as one or more slits 2803 that can be used to facilitate removal of the plug, e.g., with a bladed screw driver or the like, from the mounting opening in the mounting member. FIG. 29 shows a bottom plan view of the plug 2701 with a plain surface that can be used for supplier identification or the like. FIG. 30 shows a top plan view which illustrates an end profile of keying surfaces 2801. FIG. 31 is a cross sectional view of the plug of FIG. 30 that shows the profile of neck portion 2703. The plug can be manufactured using injection molding processes and a conventional ABS resin.

In summary, the above discussions and corresponding figures have illustrated and taught various aspects of an enclosure arranged and constructed for housing electronics and being secured to a luminaire as well as an enclosure mounting apparatus. The enclosure in some embodiments includes a first member including a neck portion extending generally perpendicular from a plane of the first member and configured to pass through a mounting opening in a mounting member and facilitate coupling the first member to the mounting member. The mounting member is configured to be secured to a surface of the luminaire at an opening in the surface. The enclosure further includes a second member mechanically coupled to the first member, where the first member and the second member provide or define a space that is the enclosure for the electronics.

The mounting member may further comprise one or more resilient tabs and the neck portion may further comprise one or more recesses, such that the neck portion is configured to be provisionally coupled to the mounting member when the resilient tabs engage the complementary recesses. The neck portion can include a keying surface and the mounting member can include a complementary keying surface that aligns with the keying surface when the enclosure is coupled to the luminaire thus establishing a predetermined angular position of the neck portion with respect to the mounting member such that the resilient tabs are aligned with the complementary recesses.

The neck portion can further comprise a neck opening for routing wiring from the electronics to the luminaire and a threaded end such that a locking nut that includes an opening for the wiring can engage the threaded end and when so engaged secure the first member to the mounting member.

The processes, apparatus, and systems, discussed above, and the inventive principles thereof are intended to and can alleviate problems associated with limited space or adverse temperature and EMI environments or installation issues caused by prior art techniques.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An enclosure arranged and constructed for housing electronics associated with a luminaire, the enclosure comprising:

a first member including a mounting interface arranged to facilitate coupling the first member to the luminaire; and wherein a neck portion extends relative to the first member such that when the first member is coupled to the luminaire, a threaded end of the neck portion extends through an opening in a lower surface of the luminaire a second member mechanically coupled to the first member, the first member and the second member providing the enclosure for electronics; and an antenna, wherein the antenna is secured to, and extends away from the enclosure.

2. The enclosure of claim 1 wherein the first member with the mounting interface is further arranged and configured to be secured to the lower surface of the luminaire when the luminaire is installed in an operating configuration.

3. The enclosure of claim 1 wherein the first member further comprises the neck portion that facilitates coupling the first member to the luminaire.

4. The enclosure of claim 3 further comprising a mounting member with a mounting opening, the mounting member arranged and configured to be secured to the surface of the luminaire, wherein the neck portion extends through the mounting opening when the first member is coupled to the luminaire.

5. The enclosure of claim 4 wherein the neck portion includes a keying surface and the mounting member includes a complementary keying surface that aligns with the keying surface when the first member is coupled to the luminaire thus establishing a predetermined angular position of the first member with respect to the mounting member.

6. The enclosure of claim 4 wherein the mounting member is arranged to be temporarily coupled to the first member by one or more resilient tabs engaging one or more complementary recesses.

7. The enclosure of claim 6 wherein the mounting member includes the one or more resilient tabs and the one or more resilient tabs include corresponding projecting members and wherein the neck portion includes the one or more complementary recesses.

8. An enclosure arranged and constructed for housing electronics associated with a luminaire, the enclosure comprising:

a first member including a mounting interface arranged to facilitate coupling the first member to the luminaire, wherein the first member further comprises a neck portion that facilitates coupling the first member to the luminaire;

a second member mechanically coupled to the first member, the first member and the second member providing the enclosure for electronics;

and a locking nut:

wherein the neck portion includes a neck opening that is generally circular in cross section, the neck opening configured to allow wiring to be routed from the electronics to the luminaire;

wherein the neck portion extends perpendicular to a plane of the first member such that when the first member is coupled to the luminaire a threaded end of the neck portion extends through an opening in a surface of the luminaire; and wherein the locking nut is configured to secure the first member to a surface of the luminaire by engaging the threaded end.

9. The enclosure of claim 8 wherein the first member with the mounting interface is further arranged and configured to be secured to a lower surface of the luminaire when the luminaire is installed in an operating configuration.

10. The enclosure of claim 8 further comprising a mounting member with a mounting opening, the mounting member arranged and configured to be secured to a surface of the luminaire, wherein the neck portion extends through the mounting opening when the first member is coupled to the luminaire.

11. The enclosure of claim 10 wherein the mounting member is arranged to be temporarily coupled to the first member by one or more resilient tabs engaging one or more complementary recesses.

12. An enclosure mounting apparatus for securing an enclosure for electronics to a luminaire, the enclosure mounting apparatus comprising:

a mounting member having a mounting opening and configured to be secured to a surface of the luminaire at a luminaire opening in the surface; and a neck portion extending from the enclosure and configured to pass through the mounting opening, the neck portion including a neck opening that is configured to allow wiring to be routed from the electronics to the luminaire, the neck portion and the mounting member including respective complementary surfaces to provide a mounting interface for provisionally coupling the enclosure to the luminaire; and a locking nut, wherein the neck portion further comprises a threaded end and the neck opening is generally circular in cross section at a plane perpendicular to an axis of the neck opening;

the threaded end extending through the mounting opening; and wherein the locking nut is configured to secure the neck portion and the enclosure to the surface of the luminaire by engaging the threaded end.

13. The enclosure mounting apparatus of claim 12 wherein the mounting member is further arranged and configured to be secured to a lower surface of the luminaire when the luminaire is installed in an operating configuration.

14. The enclosure mounting apparatus of claim 12 wherein the mounting member includes a surface with raised ridges and the locking nut further comprises a surface that controllably interferes with the raised ridges when the neck portion is secured to the luminaire by the locking nut.

15. The enclosure mounting apparatus of claim 12 wherein the neck portion includes a keying surface and the mounting member includes a complementary keying surface that aligns with the keying surface when the enclosure is coupled to the luminaire thus establishing a predetermined angular position of the neck portion with respect to the mounting member.

16. The enclosure mounting apparatus of claim 12 wherein the mounting member is arranged to be provisionally coupled to the neck portion by resilient tabs engaging complementary recesses.

17. The enclosure mounting apparatus of claim 16 wherein the mounting member includes the resilient tabs and the resilient tabs include projecting members and wherein the neck portion includes the complementary recesses, the projecting members engaging the complementary recesses when the mounting member is provisionally coupled to the neck portion.

18. The enclosure mounting apparatus of claim 17 wherein the projecting members and the complementary recesses include one or more angled surfaces selected to control the force needed to engage and disengage the projecting members and the complementary recesses.

19. An enclosure arranged and constructed for housing electronics and being secured to a luminaire, the enclosure comprising:

a first member including a neck portion extending generally perpendicular from a plane of the first member and configured to pass through a mounting opening in a mounting member and facilitate coupling the first member to the mounting member, the mounting member configured to be secured to a surface of the luminaire at an opening in the surface; and a second member mechanically coupled to the first member, the first member and the second member providing the enclosure for the electronics; and a locking nut, wherein the neck portion includes a neck opening that is generally circular in cross section, the neck opening configured to allow wiring to be routed from the electronics to the luminaire;

wherein the neck portion extends perpendicular to a plane of the first member such that when the first member is coupled to the luminaire a threaded end of the neck portion extends through the opening in the surface of the luminaire; and wherein the locking nut is configured to secure the first member to a surface of the luminaire by engaging the threaded end.

20. The enclosure of claim 19 wherein the mounting member further comprises one or more resilient tabs and the neck portion further comprises one or more recesses, the neck portion being configured to be provisionally coupled to the mounting member when the resilient tabs engage the complementary recesses.

21. The enclosure of claim 20 wherein the neck portion includes a keying surface and the mounting member includes a complementary keying surface that aligns with the keying surface when the enclosure is coupled to the luminaire thus establishing a predetermined angular position of the neck portion with respect to the mounting member such that the resilient tabs are aligned with the complementary recesses.

22. The enclosure of claim 19 wherein the locking nut includes an opening for the wiring and can engage the threaded end and when so engaged secure the first member to the mounting member.

* * * * *